US012811503B2

(12) United States Patent
Junnarkar et al.

(10) Patent No.: US 12,811,503 B2
(45) Date of Patent: Nov. 24, 2026

(54) CIRCUIT WITH OUTPUT TERMINAL AND SELECTIVE CLAMPING

(71) Applicant: TEXAS INSTRUMENTS INCORPORATED, Dallas, TX (US)

(72) Inventors: Avadhut Junnarkar, McKinney, TX (US); Mustapha El-Markhi, Richardson, TX (US); Vikram Mani, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 242 days.

(21) Appl. No.: 18/496,327

(22) Filed: Oct. 27, 2023

(65) Prior Publication Data

US 2025/0088093 A1 Mar. 13, 2025

Related U.S. Application Data

(60) Provisional application No. 63/537,231, filed on Sep. 8, 2023.

(51) Int. Cl.

*H02M 1/36* (2007.01)
*H02M 1/00* (2007.01)
*H02M 1/32* (2007.01)
*H02M 3/158* (2006.01)

(52) U.S. Cl.

CPC ........... *H02M 3/1584* (2013.01); *H02M 1/32* (2013.01); *H02M 1/36* (2013.01); *H02M 1/0032* (2021.05); *H02M 1/327* (2021.05)

(58) Field of Classification Search

CPC ...... H02M 1/0032; H02M 1/32; H02M 1/327; H02M 1/36; H02M 3/1584; H02M 3/1586; H02M 1/08–096

See application file for complete search history.

(56) References Cited

U.S. PATENT DOCUMENTS

| | | | | |
|---|---|---|---|---|
| 2016/0049864 | A1* | 2/2016 | Lee | H02M 1/36 327/327 |
| 2017/0271972 | A1* | 9/2017 | Zhao | H02M 1/08 |
| 2019/0018071 | A1* | 1/2019 | Subotski | H02H 7/1213 |
| 2023/0163676 | A1* | 5/2023 | Abesingha | H02M 1/0009 323/271 |
| 2024/0413738 | A1* | 12/2024 | Zou | H02M 1/32 |

* cited by examiner

*Primary Examiner* — Fred E Finch, III

(74) *Attorney, Agent, or Firm* — Charles F. Koch

(57) ABSTRACT

A circuit includes: an output terminal; a first transistor; and a clamp circuit. The first transistor has a first terminal, a second terminal, and a control terminal. The second terminal of the first transistor coupled to the output terminal. The clamp circuit has a second transistor and a clamp controller. The second transistor has a first terminal, a second terminal, and a control terminal. The clamp controller has a first terminal, a second terminal, and a third terminal. The first terminal of the second transistor is coupled to the control terminal of the first transistor. The third terminal of the clamp controller is coupled to the control terminal of the second transistor. The clamp controller includes a capacitor having a first terminal and a second terminal. The first terminal of the capacitor is coupled to the third terminal of the clamp controller.

19 Claims, 8 Drawing Sheets

CIRCUIT WITH OUTPUT TERMINAL AND SELECTIVE CLAMPING

CROSS REFERENCE TO RELATED APPLICATION

The present application claims priority to U.S. Provisional Application No. 63/537,231, titled "CIRCUIT WITH OUTPUT TERMINAL AND SELECTIVE CLAMPING", filed on Sep. 8, 2023, which is hereby incorporated by reference in its entirety.

BACKGROUND

A clamp circuit may be used to limit voltage at a particular terminal of a circuit. If the voltage at a terminal reaches or exceeds a target voltage, an example clamp circuit may couple the terminal to ground to limit the voltage at the terminal to the target voltage. For some multi-purpose terminals, the operations of the example clamp circuit may be too restrictive and/or may affect other terminals.

SUMMARY

In an example, a circuit includes: an output terminal; a first transistor; and a clamp circuit. The first transistor has a first terminal, a second terminal, and a control terminal. The second terminal of the first transistor coupled to the output terminal. The clamp circuit has a second transistor and a clamp controller. The second transistor has a first terminal, a second terminal, and a control terminal. The clamp controller has a first terminal, a second terminal, and a third terminal. The first terminal of the second transistor is coupled to the control terminal of the first transistor. The third terminal of the clamp controller is coupled to the control terminal of the second transistor. The clamp controller includes a capacitor having a first terminal and a second terminal. The first terminal of the capacitor is coupled to the third terminal of the clamp controller.

In another example, a circuit includes: an output terminal; and control circuitry coupled to the output terminal. The control circuitry includes a transistor and a clamp circuit. The transistor has a control terminal. The control circuitry is configured to: maintain the output terminal in a disabled state and until a ready condition is detected; operate the clamp circuit to clamp a voltage at the control terminal of the transistor during the disabled state; enable the output terminal responsive to the ready condition being detected; during a first interval after the output terminal is enabled, operate the clamp circuit partially clamp the voltage at the control terminal of the transistor; and during a second interval after the output terminal is enabled, operate the clamp circuit to stop clamping the voltage at the control terminal of the transistor.

In yet another example, a system includes: a multiphase direct-current to direct-current (DC/DC) converter having an output terminal. The multiphase DC/DC converter includes: a first transistor and a clamp circuit. The first transistor has a first terminal, a second terminal, and a control terminal. The second terminal of the first transistor is coupled to the output terminal. The clamp circuit has a second transistor and a clamp controller. The second transistor has a first terminal, a second terminal, and a control terminal. The clamp controller has a first terminal, a second terminal, and a third terminal. The first terminal of the second transistor is coupled to the control terminal of the first transistor. The third terminal of the clamp controller is coupled to the control terminal of the second transistor. The clamp controller includes a capacitor having a first terminal and a second terminal. The first terminal of the capacitor is coupled to the third terminal of the clamp controller.

DETAILED DESCRIPTION

Figure 1:
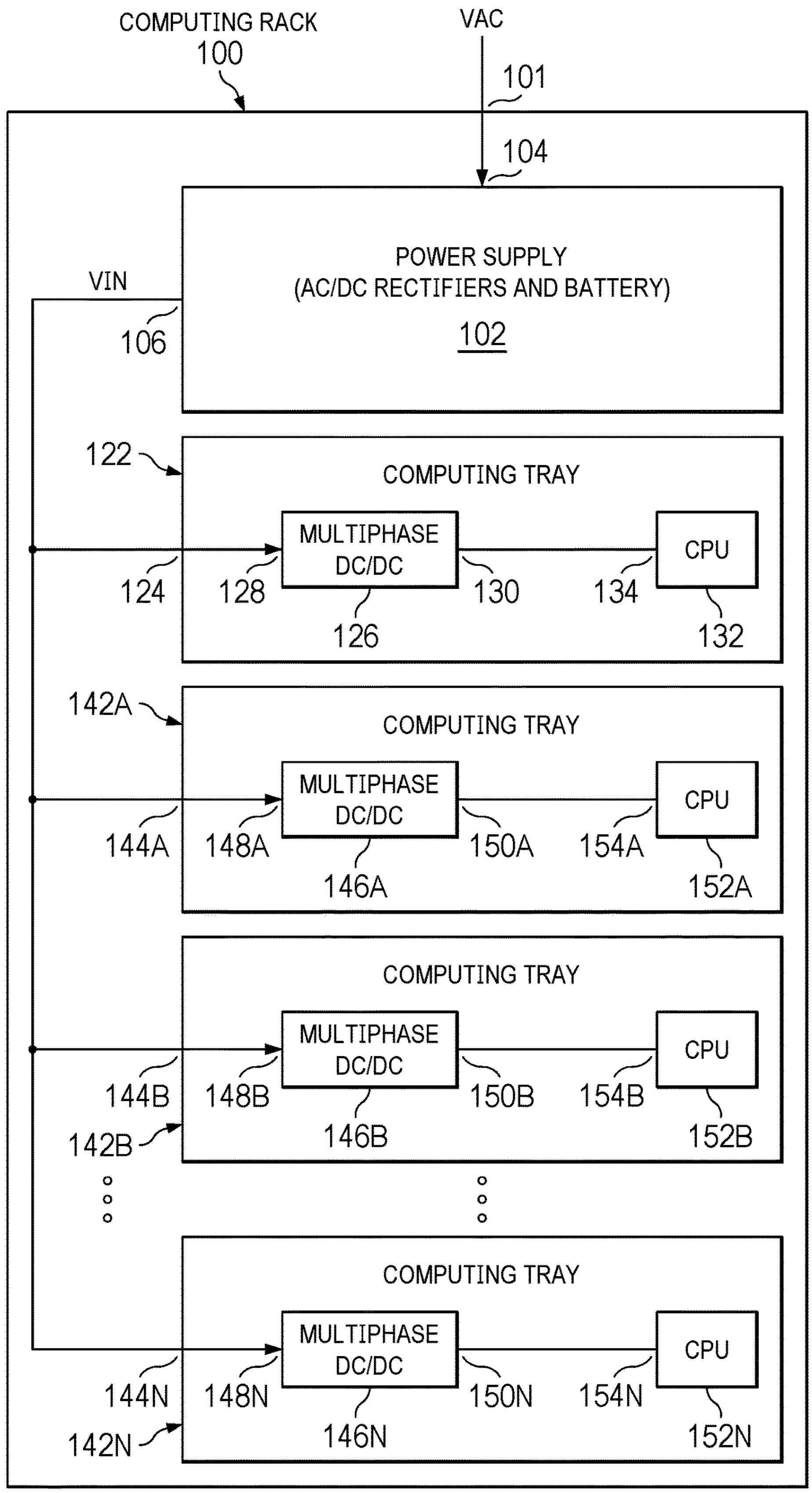
FIG. 1 is a block diagram showing an example computing rack.

The same reference numbers or other reference designators are used in the drawings to designate the same or similar features. Such features may be the same or similar either by function and/or structure.

Described herein is a circuit with an output terminal and selective clamping. The circuit may also provide an enable/disable function for the output terminal. In some examples, when the output terminal is disabled, clamping is turned on. When the output terminal is enabled, clamping is adjusted. In some examples, clamping is turned off after a time interval relative to the output terminal being enabled. In some examples, clamping may be turned off slowly during the time interval once the output terminal is enabled. Once the time interval is complete, clamping is fully turned off.

In some examples, the circuit with an output terminal and selective clamping is part of a multiphase direct-current to direct-current (DC/DC) converter or a related power stage. A related system may have a plurality of such multiphase DC/DC converters. Each multiphase DC/DC converter may have a plurality of power stages and a controller. Each power stage may have an output terminal coupled to a controller and selective clamping.

In some examples, before a power supply for a multiphase DC/DC converter or related power stages is ready, the respective output terminal of a multiphase DC/DC converter or a related power stage is disabled and clamping is turned on. Once the power supply for the multiphase DC/DC converter or the related power stage is ready, the respective output terminal is enabled and clamping is turned off after a time interval. As another option, clamping may be turned off slowly during the time interval once the respective output terminal is enabled. In different examples, respective output terminals of a multiphase DC/DC circuits or related power stages may be enabled together or separately.

In some scenarios, the output terminals of a multiphase DC/DC circuit or related power stages are coupled together or are coupled to the same sense terminal of a controller. Accordingly, signaling using an enabled output terminal may be affected by the enabled/disabled status of other output terminals or their respective signals. This arrangement of coupling output terminals together or coupling output terminals to the same sense terminal of a controller results in a selective "OR" signaling arrangement of the output terminals. With the selective "OR" signaling arrangement: all output terminals are affected by any of the output terminals being disabled (i.e., signaling is grounded until all the output terminals are enabled); once all output terminals are enabled, signaling provided by the output terminals will result in only the highest signal being provided to the sense terminal of the controller.

In some examples, the controller operates to: interpret a voltage level below a first threshold at its sense terminal for less than a threshold amount of time as an indication of at least one of the output terminals not being enabled; and interpret a voltage level below the first threshold at its sense terminal for more than the threshold amount of time as an indication of a power supply error. In some examples, the controller also operates to: interpret a voltage level above a second threshold at its sense terminal as an overcurrent condition of at least one of the multiphase DC/DC converters; and interpret a voltage level between the first threshold and the second threshold at its sense terminal as a highest sense signal of the multiphase DC/DC converters or related power stages. In some examples, the combined "OR" signaling described herein provides a temperature sense signal. Responsive to the combined "OR" signaling having a value between the first threshold and the second threshold, the controller may operate to adjust operations (e.g., a duty-cycle) of one or more of the power stages to re-balance a multiphase DC/DC converter. As another option, the controller may operate to turn off a particular power stage and adjust the duty-cycle of remaining power stages to maintain a target power output. In some examples, the power provided by the power stages of a multiphase DC/DC converter is combined and used to power a variable load such as a processor. If the combined "OR" signaling has a value below the first threshold, the controller may cause a multiphase DC/DC converter to shut down or may perform another power supply fault response. Similarly, if the combined "OR" signaling has a value greater than the second threshold, the controller may cause a multiphase DC/DC converter to shut down or may perform another overcurrent response.

FIG. 1 is a block diagram showing an example computer rack 100. The computer rack 100 includes a power supply circuit 102 a computing tray 122. In some examples, the computer rack 100 may also include additional computing trays 142A to 142N. The computing rack 101 has a terminal 101. The power supply circuit 102 has a first terminal 104 and a second terminal 106. The computing tray 122 has a terminal 124 and includes a multiphase DC/DC converter 126 and a processor ("CPU") 132. The multiphase DC/DC converter 126 has a first terminal 128 and a second terminal 130. The processor 132 has a terminal 134.

Each of the computing trays 142A to 142N has a respective terminal 144A to 144N. Each of the computing trays 142A to 142N includes a respective multiphase DC/DC converter 146A to 146N and a respective processor 152A to 152N. Each of the multiphase DC/DC converters 146A to 146N has a respective first terminal 148A to 148N and a respective second terminal 150A to 150N. Each of the processors 152A to 152N has a respective terminal 154A to 154N.

In the example of FIG. 1, the first terminal 104 of the power supply circuit 102 is coupled to the terminal 101 of the computing rack 100. The second terminal 106 of the power supply circuit 102 is coupled to the terminal 124 of the computing tray 122. The second terminal 106 of the power supply circuit 102 is also coupled to the terminals 144A to 144N of the computing trays 142A to 142N.

The first terminal 128 of the multiphase DC/DC converter 126 is coupled to the terminal 124 of the computing tray 122. The second terminal 130 of the multiphase DC/DC converter 126 is coupled to the terminal 134 of the processor 132. Each of the first terminals 148A to 148N of the multiphase DC/DC converters 146A to 146N is coupled to a respective one of the terminals 144A to 144N of the computing trays 142A to 142N. Each of the second terminals 150A to 150N of the multiphase DC/DC converters 146A to 146N is coupled to a respective one of the terminals 154A to 154N of the processors 152A to 152N.

In operation, the power supply circuit 102 operates to: receive an alternating-current (AC) voltage Vac at its first terminal 104; and provide a DC input voltage (VIN) at its second terminal responsive to Vac. In some examples, the power supply circuit 102 includes AC/DC rectifiers and a battery.

The computing tray 122 operates to: receive VIN at the terminal 124; provide power to the processor 132 responsive to VIN using the multiphase DC/DC converter 126; and perform processing operations using the powered processor 132.

Each of the computing trays 142A to 142N operates to: receive VIN (at one of the respective terminals 144A to 144N); provide power to the processors 152A to 152N responsive to VIN using respective multiphase DC/DC converters 146A to 146N; and perform processing operations using the powered processors 152A to 152N.

Figure 2:
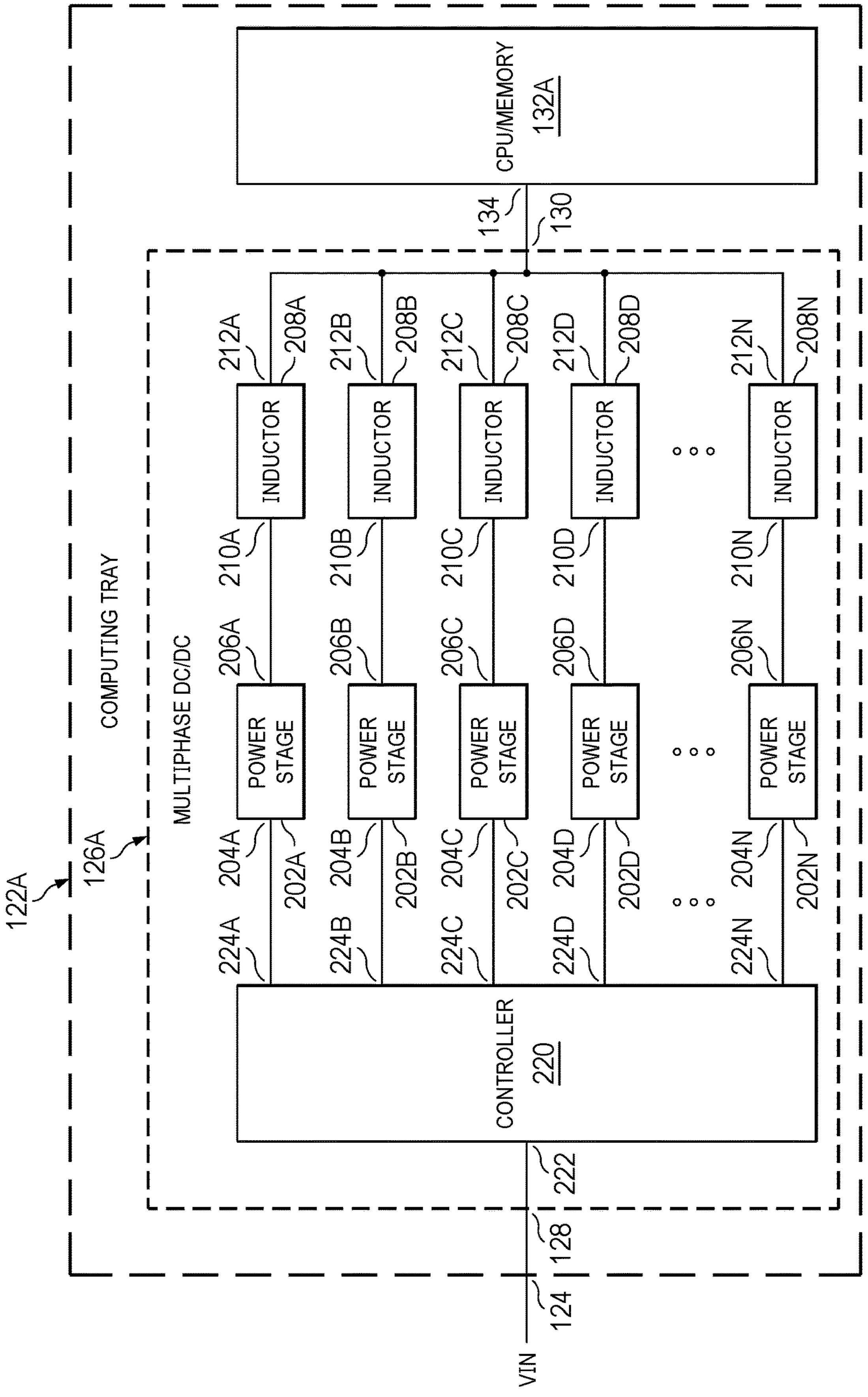
FIG. 2 is a block diagram showing an example computing tray.

In some examples, each of the multiphase DC/DC converters 126 and 146A to 146N includes a controller, multiple power stages, and multiple inductors (see e.g., FIG. 2). In some examples, each of the power stages includes an output terminal coupled to the controller and selective clamping. Each of the power stages may also provide an enable/disable function for each respective output terminal. In some examples, when each respective output terminal is disabled, clamping is turned on. When each respective output terminal is enabled, clamping is turned off. In some examples, clamping is turned off after a time interval relative to each respective output terminal being enabled. In some examples, clamping may be turned off slowly during the time interval once each respective output terminal is enabled. A more detailed description of such output terminals and selective clamping is provided hereafter.

FIG. 2 is a block diagram showing an example computing tray 122A. The computing tray 122A is an example of the computing tray 122 in FIG. 1 and has the terminal 124 described in FIG. 1. In the example of FIG. 2, the computing tray 122A includes a multiphase DC/DC converter 126A and a processor 132A. Each of the computing trays 142A to 142N may have a similar architecture. The multiphase DC/DC converter 126A is an example of the multiphase DC/DC converter 126 in FIG. 1 and has the first terminal 128 and the second terminal 130 described in FIG. 1. The processor 132A is an example of the processor 132 in FIG. 1 and has the terminal 134 described in FIG. 1.

In the example of FIG. 2, the multiphase DC/DC converter 126A includes a controller 220, power stages 202A to 202N, and inductors 208A to 208N. The controller has a first terminal 222 and second terminals 224A to 224N. Each of the power stages 202A to 202N has a respective first terminal 204A to 204N and a respective second terminal 206A to 206N. Each of the inductors 208A to 208N has a respective first terminal 210A to 210N and a respective second terminal 212A to 212N.

In the example of FIG. 2, the first terminal 128 of the multiphase DC/DC converter 126A is coupled to the terminal 124 of the computing tray 122. The first terminal 222 of the controller 220 is coupled to the first terminal 128 of the multiphase DC/DC converter 126A. Each of the second terminals 224A to 224N of the controller 220 is coupled to a respective first terminal 204A to 204N of the power stages 202A to 202N. Each of the second terminals 206A to 206N of the power stages 202A to 202N is coupled to a respective one of the first terminals 210A to 210N of the inductors 208A to 208N. Each of the second terminals 212A to 212N of the inductors 208A to 208N is coupled to the second terminal 130 of the multiphase DC/DC converter 126A. As shown, the second terminal 130 of the multiphase DC/DC converter 126A is coupled to the terminal 134 of the processor 132A.

In the example of FIG. 2, the controller 220 operates to: receive VIN at the first terminal 222; and provide respective supply voltages at the second terminals 224A to 224N, responsive to VIN, for each of the power stages 202A to 202N.

The computing tray 122A operates to: receive VIN (not shown); provide power to the processor 132A responsive to VIN using the multiphase DC/DC converter 126A; and perform processing operations using the processor 132A.

The multiphase DC/DC converter 126A operates to: receive VIN at the first terminal 128; provide supply voltages (e.g., VIN_1 to VIN_N) to each of the power stages 202A to 202N responsive to VIN and a multiphase control scheme for the power stages 202A to 202N; store energy from each of the power stages 202A to 202N in the inductors 208A to 208N; and provide a combined current and an output voltage (VOUT) at the second terminal 130 responsive to VIN, the operations of the power stages 202A to 202N, and the operations of the inductors 208A to 208N. The processor 132A operates to perform processing operations responsive to VOUT and the current provided at the second terminal 130.

In some examples, each of the power stages 202A to 202N includes an output terminal (not shown) and selective clamping. Each of the power stages 202A to 202N may also provide an enable/disable function for each respective output terminal. In some examples, when each respective output terminal is disabled, clamping is turned on. When each respective output terminal is enabled, clamping is turned off. In some examples, clamping is turned off after a time interval relative to each respective output terminal being enabled. In some examples, clamping may be turned off slowly during the time interval once each respective output terminal is enabled. A more detailed description of such output terminals and selective clamping is provided hereafter.

Figure 3:
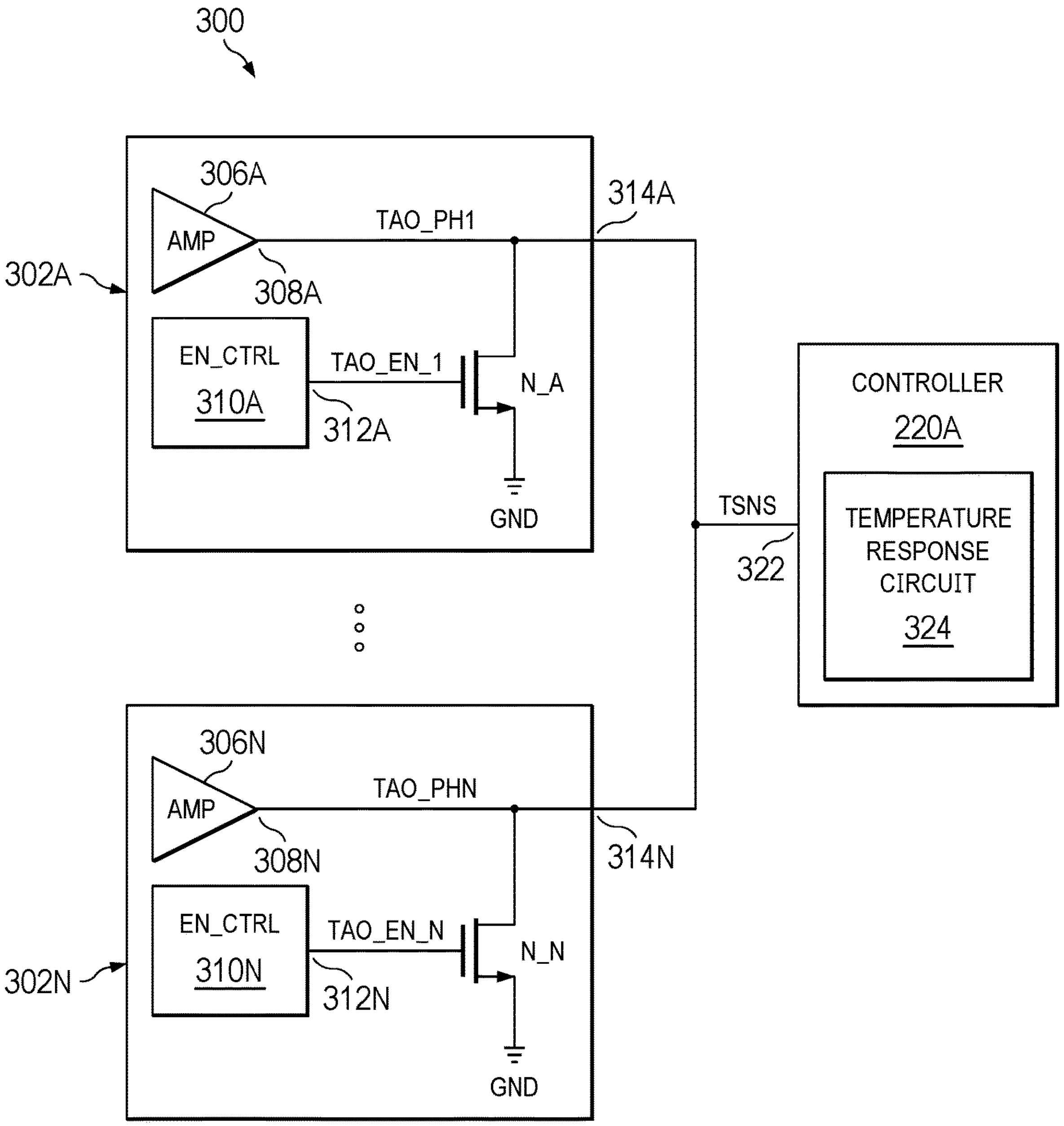
FIG. 3 is a diagram example power converter circuitry.

FIG. 3 is a diagram of an example power converter circuitry 300. In some examples, the power converter circuitry 300 is part of a multiphase DC/DC converter, such as the multiphase DC/DC converter 126 in FIG. 1, the multiphase DC/DC converter 126A in FIG. 2, or any of the multiphase DC/DC converters 146A to 146N in FIG. 1. As shown, the power converter circuitry 300 includes power stages 302A to 302N and a controller 220A. The power stages 302A to 302N are examples of the power stages 202A to 202N. The controller 220A is an example of the controller 220 in FIG. 2.

In the example of FIG. 3, each of the power stages 302A to 302N has a respective output terminal 314A to 314N and includes a respective operational amplifier 306A to 306N, a respective transistor N_A to N_N, and a respective enable controller 310A to 310N. Each of the operational amplifiers 306A to 306N has a respective terminal 308A to 308N. Each of the transistors N_A to N_N has a respective first terminal, a respective second terminal, and a respective control terminal. Each of the enable controllers 310A to 310N has a respective terminal 312A to 312N. The controller 220A has a sense terminal 322 and includes a temperature response circuit 324.

In the example of FIG. 3, each of the terminals 308A to 308N of the operational amplifiers 306A to 306N is coupled to a respective output terminal 314A to 314N of the power stages 302A to 302N. The first terminal of each of the transistors N_A to N_N is also coupled to a respective one of the output terminals 314A to 314N. The second terminal of each of the transistors N_A to N_N is coupled to a respective ground terminal or ground. The control terminal of each of the transistors N_A to N_N is coupled to a respective one of the terminals 312A to 312N of the enable controllers 310A to 310N. As shown, the output terminals 314A to 314N of the power stages 302A to 302N is coupled to the sense terminal 322 of the controller 220A.

During power conversion operations, each of the power stages 302A to 302N operates to: receive an input voltage (e.g., VIN_1 to VIN_N in FIG. 2) at a respective first terminal (e.g., one of the first terminals 204A to 204N in FIG. 2); and provide an output voltage and current at a respective second terminal (e.g., one of the second terminals 206A to 206N in FIG. 2) responsive to the input voltage and switch control signals (e.g., pulse-width modulation signals or other switch control signals).

In some examples, each of the power stages 302A to 302N includes a respective output terminal 314A to 314N and selective clamping. Each of the power stages 302A to 302N may also provide an enable/disable function for each respective output terminal 314A to 314N. In the example of FIG. 3, the enable/disable function is performed by controlling the transistors N_A to N_N. More specifically, when one of the transistors N_A to N_N is turned on, the respective output terminal 314A to 314N is disabled (i.e., coupled to ground). When one of the transistors N_A to N_N is turned off, the respective output terminal 314A to 314N is enabled (i.e., not coupled to ground). In some examples, when a respective output terminal 314A to 314N is disabled, clamping is turned on. When a respective output terminal 314A to 314N is enabled, clamping is turned off. In some examples, clamping is turned off after a time interval relative to each respective output terminal 314A to 314N being enabled. In some examples, clamping may be turned off slowly during the time interval once each respective output terminal 314A to 314N is enabled.

In the example of FIG. 3, the output terminals 314A to 314N of the power stages 302A to 302N are coupled to the sense terminal 322 of the controller 220A. Accordingly, signaling using an enabled output terminal may be affected by the enabled/disabled status of other output terminals or their respective signals. This arrangement of coupling the output terminals 314A to 314N of the power stages 302A to 302N together or coupling the output terminals 314A to 314N of the power stages 302A to 302N to the sense terminal 322 of the controller 220A results in a selective "OR" signaling arrangement of the output terminals 314A to 314N. With the selective "OR" signaling arrangement: all of the output terminals 314A to 314N are affected by any of the output terminals 314A to 314N being disabled (i.e., signaling is grounded until all the output terminals 314A to 314N are enabled); once all output terminals 314A to 314N are enabled, signaling provided by the output terminals 314A to 314N will result in only the highest signal being provided to the sense terminal 322 of the controller 220A.

In some examples, the controller 220A operates to: interpret a voltage level below a first threshold at the sense terminal 322 for less than a threshold amount of time as an indication of at least one of the output terminals 314A to 314N not being enabled; and interpret a voltage level below the first threshold at the sense terminal 322 for more than the threshold amount of time as an indication of a power supply error for one or more of the power stages 302A 302N. In some examples, the controller 220A also operates to: interpret a voltage level above a second threshold at the sense terminal 322 as an overcurrent condition of at least one of the power stages 302A to 302N; and interpret a voltage level between the first threshold and the second threshold at the sense terminal 322 as a highest sense signal of the power stages 302A to 302N. In some examples, the combined "OR" signaling described herein provides a temperature sense signal (TSNS), where the temperature response circuit 324 of the controller 220A interprets and responsive to the voltage level at the sense terminal 322. Responsive to the combined "OR" signaling having a value between the first threshold and the second threshold, the controller 220A and temperature response circuit 324 may operate to adjust operations (e.g., a duty-cycle) of one or more of the power stages 302A to 302N to re-balance a multiphase DC/DC converter. As another option, the controller 220A and temperature response circuit 324 may operate to turn off a particular power stage and adjust the duty-cycle of remaining power stages to maintain a target power output. In some examples, the power provided by the power stages 302A to 302N is combined and used to power a variable load such as a processor. If the combined "OR" signaling has a value below the first threshold, the controller 220A may cause a multiphase DC/DC converter to shut down or may perform another power supply fault response. Similarly, if the combined "OR" signaling has a value greater than the second threshold, the controller 220A may cause a multiphase DC/DC converter to shut down or may perform another overcurrent response.

In the example of FIG. 3, the output terminal 314A provides a first sense signal (TAO_PH1) when enabled. Each of the output terminals 314B to 314N provides a respective sense signal (TAO_PH2 to TAO_PHN) when enabled. The output terminal 314A is enabled when the transistor N_A is turned off by a control signal (TAO_EN_1) provided by the enable controller 310A. Each of the output terminals 314B to 314N is enabled when a respective transistor N_B to N_N is turned off by a control signal (TAO_EN_2 to TAO_EN_N) provided by respective enable controllers 310B to 310N. In some examples, the enable controllers 310B to 310N provide TAO_EN_2 to TAO_EN_N responsive to a switch control signal, such as pulse-width modulation signal, being provided to a respective power stage.

In some examples, the output terminals 314A to 314N are referred to as TAO terminals or pins. In such examples, each of the output terminals 314A to 314N is a multi-purpose terminal or pin. In some examples, TAO terminals or pins are coupled together and provide an analog-OR function. In some examples, the TAO terminals or pins function as a TSNS net to provide die temperature sensing.

In such examples, the controller 220A may use information regarding the temperature of the power stages 302A to 302N to perform multiphase DC/DC converter control operations such as power stage balancing. In some examples, the TAO terminal or pin of the power stage with the highest temperature determines the value of TSNS while the other TAO terminals or pins sink current.

In some examples, each TAO terminal or pin has a target voltage range. In one example, a voltage of 800 mV may indicate a temperature of 25° C. with a slope of 8 mV/° C. In this examples, a range of −40° C. up to 175° C. corresponds to 0.28V to 2.0V. In some examples, a TAO terminal or pin may also indicate a power supply fault or overcurrent condition. To indicate a power supply fault, a TAO terminal or pin may provide a voltage below a first threshold (e.g., 0.2V or another value below 0.28V in the example provided). To indicate an overcurrent condition, a TAO terminal or pin may provide a voltage above a second threshold (e.g., 2.5V or another value above 2.0V in the example provided).

Before power-up, all of the power stages 302A to 302N may pull down their respective TAO terminals to indicate a power supply fault such as an undervoltage condition. After power-up, all of the power stages 302A to 302N enable their respective TAO terminals and TSNS is able to rise above the first threshold. The controller 220A is thus able to determine that the power stages 302A to 302N are ready for switching operations to provide power to a load. When multiple power stages are powering up, TSNS overshoot may occur. This may occur, for example, when multiple output terminals 314A to 314N are enabled, but not all. In this scenario, when a last of the output terminals 314A to 314N is enabled, the contribution of the previously enabled output terminals 314A to 314N will drive TSNS too high. When TSNS overshoots, the controller 220A may sense an incorrect parameter (e.g., temperature), incorrectly identify a fault, or surpass a voltage limit of the sense terminal 322. To prevent TSNS overshoot, the output terminals 314A to 314N are selectively clamped (before being enabled).

Figure 4:
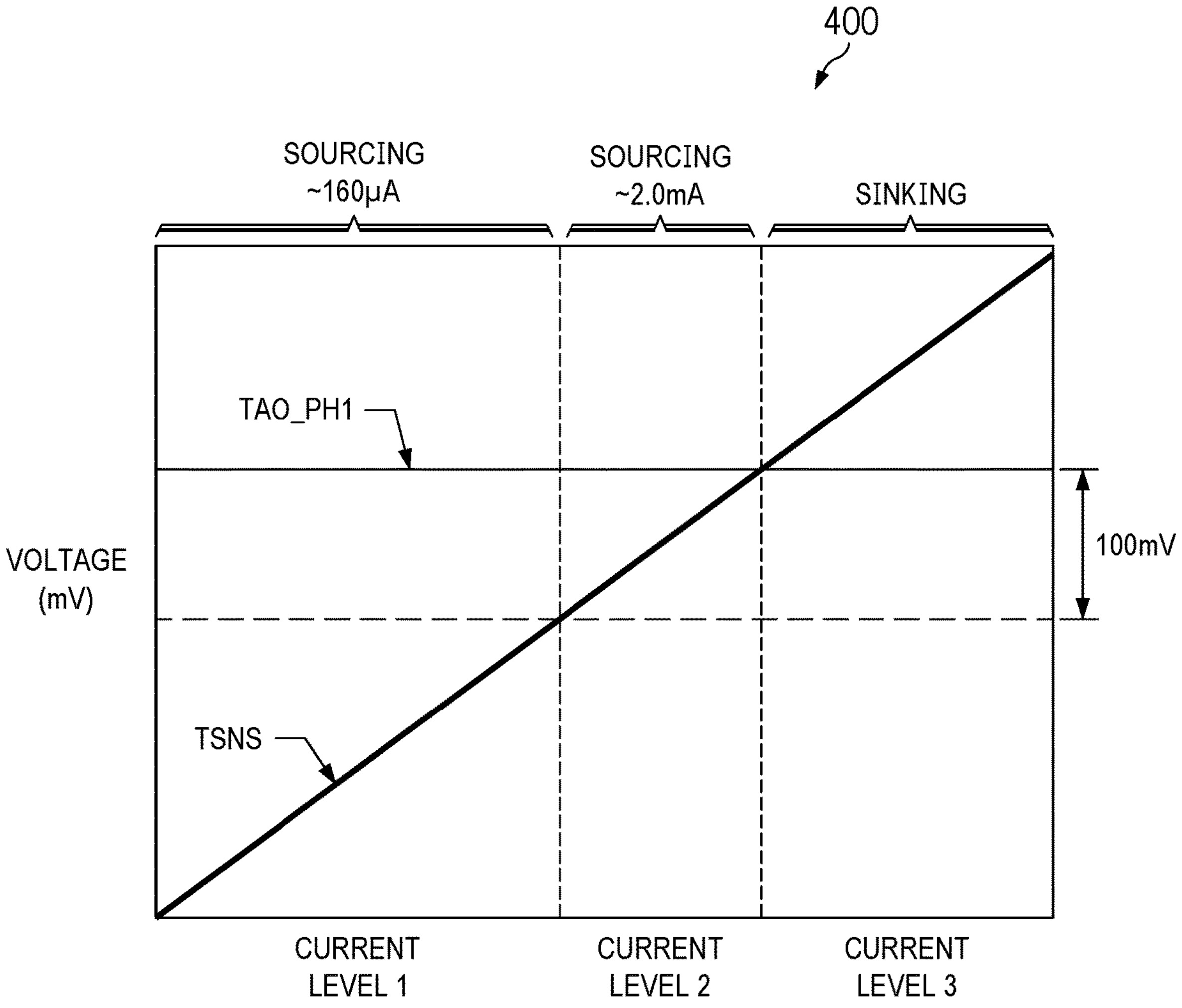
FIG. 4 is a graph showing sense signal voltage and current zones for an example output terminal.

FIG. 4 is a graph 400 showing sense signal voltage and current levels for an example output terminal. In the graph 400, TAO_PH1 is the voltage value that the example output terminal for FIG. 4 (e.g., the output terminal of the power stage 302A in FIG. 3) is trying to regulate TSNS to. Assuming TAO_PH1 is steady and TSNS is below TAO_PH1, then a first current level (e.g., 160 μA) will be sourced at the output terminal in an attempt to increase TSNS up to TAO_PH1. If TSNS is within a threshold range below (e.g., within 100 mV) TAO_PH1 and TAO_PH1 is steady, then a second current level (2 mV) will be sourced at the output terminal in an attempt to increase TSNS up to TAO_PH1. If TSNS is above TAO_PH1 and TAO_PH1 is steady, then the output terminal sinks current in an attempt to regulate TSNS to TAO_PH1.

Figure 5:
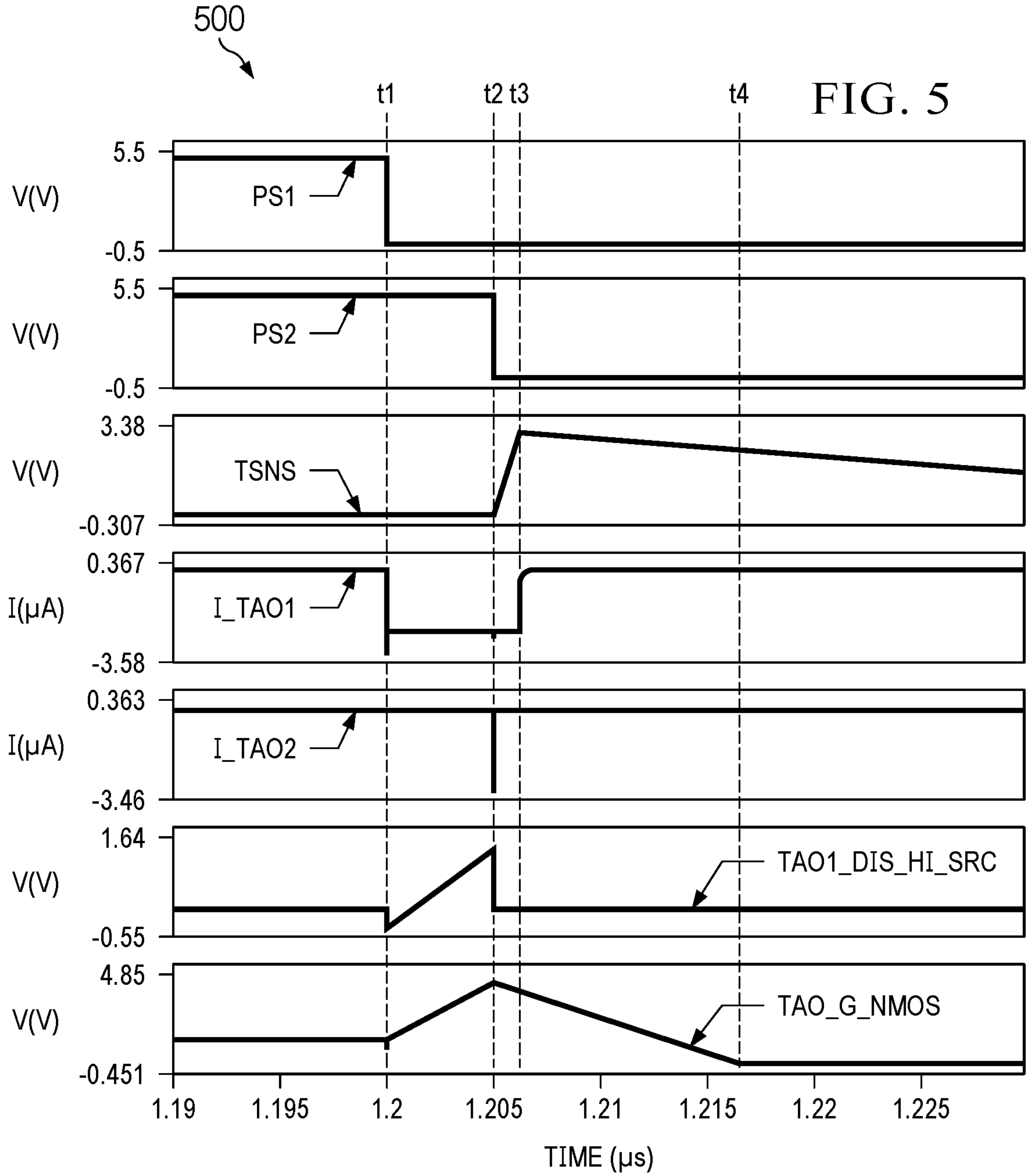
FIG. 5 is a timing diagram showing example signals of a multiphase DC/DC converter without output terminal clamping.

FIG. 5 is a timing diagram 500 showing example signals of a multiphase DC/DC converter without output terminal clamping. The example signals include a first phase disable signal (PS1), a second phase disable signal (PS2), TSNS, a first TAO terminal current (I_TAO1), a second TAO terminal current (I_TAO2), a control signal (TAO1_DIS_HI_SRC), and a gate voltage of the source follower transistor (TAO_G_NMOS). In some examples, TAO1_DIS_HI_SRC selects between output current options for the related output terminal. Without limitation, TAO1_DIS_HI_SRC may be provided by a comparator that compares TSNS with TAO_PH1 (see e.g., FIG. 4). In some examples, when TAO1_DIS_HI_SRC is de-asserted, the output current of the related output terminal is a first output current (e.g., 2 mA). When TAO1_DIS_HI_SRC is asserted, the output current of the related output terminal is a second output current (e.g., 160 μA). In the example of FIG. 5, the source terminal of the source follower transistor is coupled to the TAO1 terminal. Relating FIG. 5 to FIG. 6, the transistor N1 in FIG. 6 is an example of a source follower transistor, where the source terminal of the transistor N1 is coupled to the output terminal 314A.

In the example of FIG. 5, the first TAO terminal is enabled when PS1 is de-asserted at time t1. In some examples, PS1 corresponds to the inverse of TAO_EN_1 in FIG. 3. Even though the first TAO terminal is enabled at time t1, the second TAO terminal is not enabled until time t2 when PS2 is de-asserted. In some examples, PS2 corresponds to the inverse of TAO_EN_2 in FIG. 3. Between the time t1 and the time t2: TSNS stays low due to the second TAO terminal being disabled during this interval; I_TAO1 increases from zero to the first output current option (e.g., −2 mA), where negative current corresponds to sourcing current in FIG. 5); TAO1_DIS_HI_SRC rises; and TAO_G_NMOS rises. In the example of FIG. 5, the amount of current sourced by I_TAO1 is controlled by TAO_DIS_HI_SRC. Because TAO_DIS_HI_SRC is low before time t1, I_TAO1 sources the first output current from time t1 to time t2. Before TAO_DIS_HI_SRC reaches an asserted value (e.g., a logical 1 value), which would result in I_TAO1 transitioning to the second output current option (e.g., −160 uA), TSNS overshoot happens. The overshoot is due to the rising value of TAO_G_NMOS from time t1 to time t2 combined with the first output current option (e.g., −2 mA).

After the first and second TAO terminals are enabled at time t2, TSNS rises until time t3. In some examples, TSNS rising involves charging one or more capacitors coupled to the first and second TAO terminals. Between times t2 and t3: TSNS overshoots; I_TAO2 briefly sources the first output current (due to its respective source follower gate voltage, equivalent to TAO_G_NMOS, not rising to above a threshold value) before returning to zero; TAO1_DIS_HI_SRC drops to zero; and TAO_G_NMOS begins to ramp down. Even though the overshoot of TSNS may be detectable, the gate voltage of the source follower transistor is saturated and does not discharge quickly. Accordingly, the TAO1 terminal continues to source current, which keeps TSNS high. At time t3, TSNS begins to ramp down, I_TAO1and I_TAO2 return to zero, and TAO_G_NMOS continues to ramp down. At time t4, TSNS continues to ramp down, and TAO_G_NMOS finishes ramping down to zero. In some examples, TSNS overshoot may cause the TSNS value to go as high as 5V, which poses functional and reliability risks. For example, if the TSNS value is above a threshold (e.g., 2.7V), a controller (e.g., the controller 220A in FIG. 3) may interpret the TSNS value as a fault indication. Also, the sense terminal 322 of the controller 220A may be rated for a particular voltage range (e.g., 3.3V or less). Overshoot of the TSNS value above the rating of the sense terminal 322 may cause damage or malfunction.

Figure 6:
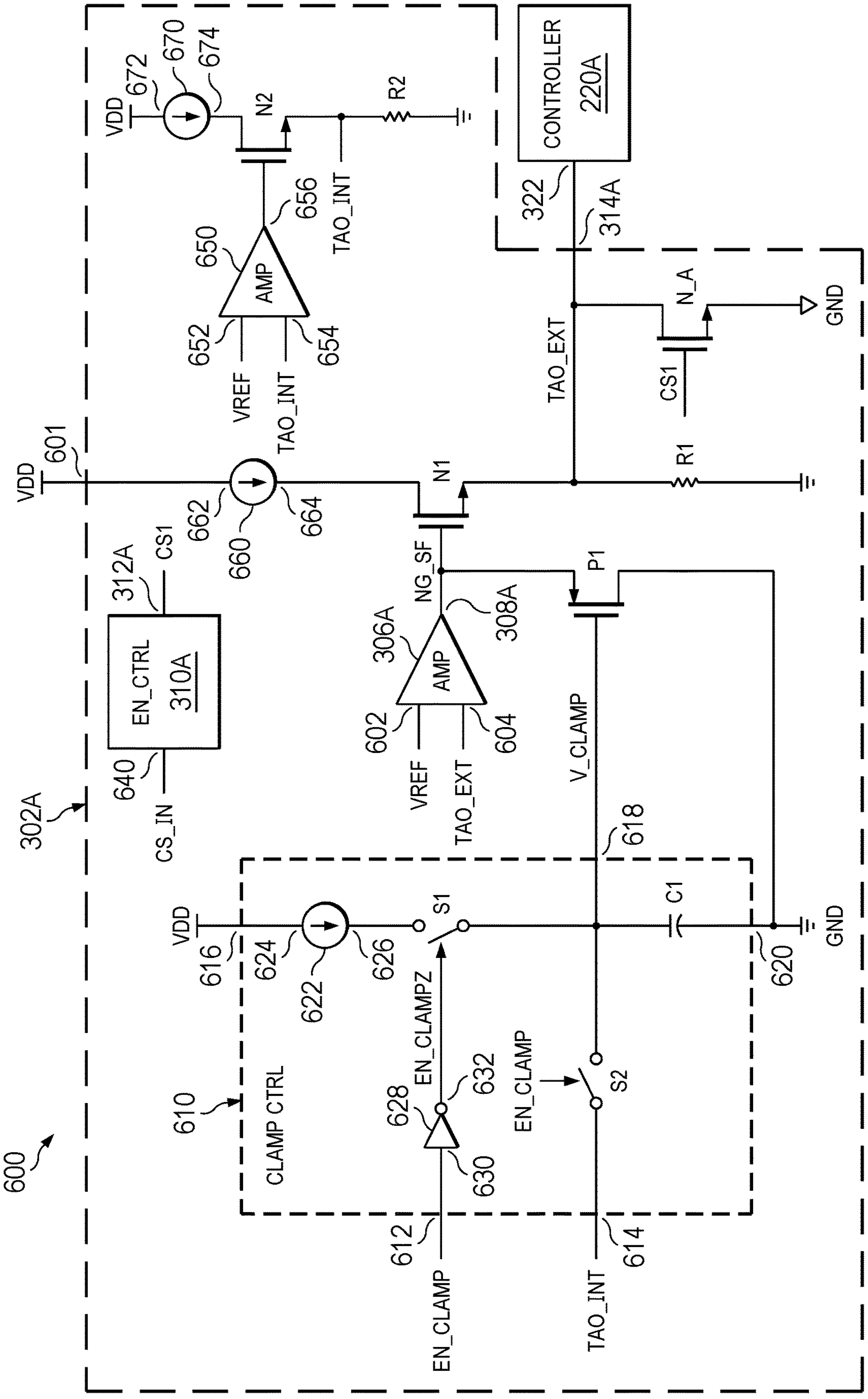
FIG. 6 is a schematic diagram of example multiphase DC/DC converter circuitry.

FIG. 6 is a schematic diagram showing example multiphase DC/DC converter circuitry 600. The multiphase DC/DC converter circuitry 600 is an example of each of the multiphase DC/DC converter 126 in FIG. 1, the multiphase DC/DC converter 126A in FIG. 2, or the multiphase DC/DC converters 146A to 146N in FIG. 1. In the example of FIG. 6, the multiphase DC/DC converter circuitry 600 includes the power stage 302A and the controller 220A. The multiphase DC/DC converter circuitry 600 may also include additional power stages, such as the power stages 302B to 302N in FIG. 3. Each of the power stages may have components and an arrangement similar to the power stage 302A shown in FIG. 6.

The power stage 302A has the output terminal 314 and includes the operational amplifier 306A, the enable controller 310A, and the transistor N_A described in FIG. 3. In the example of FIG. 6, the operational amplifier 306A has a first terminal 602, a second terminal 604, and the terminal 308A described in FIG. 3. Also, the enable controller 310 has a first terminal 640 and the terminal 312A described in FIG. 3. The transistor N_A is an n-channel metal-oxide semiconductor (NMOS) transistor, and has a first terminal, a second terminal, and a control terminal.

In the example of FIG. 6, the power stage 302A also has a power terminal 601 and includes a first current source 660, a second current source 670, transistors N1 and N2, resistors R1 and R2, an operational amplifier 650, a clamp switch (transistor P1), and a clamp controller 610 in the arrangement shown. The power terminal 601 receives a supply voltage (VDD). The first current source 660 has a first terminal 662 and a second terminal 664. The second current source 670 has a first terminal 672 and a second terminal 674. Each of the transistors N1 and N2 is an NMOS transistor, and has a respective first terminal, a respective second terminal, and a respective control terminal. Each of the resistors R1 and R2 has a first terminal and a second terminal. The operational amplifier 650 has a first terminal 652, a second terminal 654, and a third terminal 656.

The transistor P1 is a p-channel metal-oxide semiconductor (PMOS) transistor, and a first terminal, a second terminal and a control terminal. The clamp controller 610 has a first terminal 612, a second terminal 614, a third terminal 616, a fourth terminal 618, and a fifth terminal 620. In the example of FIG. 6, the clamp controller 610 includes a current source 622, a first switch S1, a second switch S2, an inverter 628, and a capacitor C1 in the arrangement shown. The current source 622 has a first terminal 624 and a second terminal 626. The switch S1 has a first terminal, a second terminal, and a control terminal. The switch S2 has a first terminal, a second terminal, and a control terminal. In some examples, the switches S1 and S2 are NMOS transistors. The inverter 628 has a first terminal 630 and a second terminal 632. As another option, the switch S1 may be a PMOS transistor and the inverter 628 is omitted. The capacitor C1 has a first terminal and a second terminal.

In the example of FIG. 6, the power terminal 601 of the power stage 302A is coupled to the first terminal 662 of the first current source 660. The second terminal 664 of the first current source is coupled to the first terminal of the transistor N1. The second terminal of the transistor N1 is coupled to the first terminal of the resistor R1 and to the output terminal 314A. One difference between the example of FIG. 3 and the example of FIG. 6 is that the terminal 308A of the operational amplifier 306A is coupled to the control terminal of the transistor N1 rather than the output terminal 314A. In other words, with the arrangement of FIG. 6, the voltage at the output terminal 314A is selectively clamped indirectly by selectively clamping the voltage at the control terminal of the transistor N1. In some examples, each of the power stages 302A to 302N in FIG. 3 may include a respective current source similar to the first current source 660, a respective transistor similar to the transistor N1, and a respective resistor similar to the resistor R1. As shown in FIG. 6, the first terminal 602 of the operational amplifier 306A receives a reference voltage (VREF). In some examples, VREF is derived from a temperature sensor, such as a temperature sensing diode, and varies linearly as a function of temperature. The second terminal 604 of the operational amplifier 306A receives an external TAO signal (TAO_EXT), where TAO_EXT is the voltage at the output terminal 314A.

As shown, the second terminal of the resistor R1 is coupled to a ground terminal or ground. The first terminal of the transistor N_A is also coupled to the first terminal of the resistor R1 and to the output terminal 314A. The second terminal of the transistor N_A is coupled to a ground terminal or ground. The control terminal of the transistor N_A is coupled to the terminal 312A of the enable controller 310A. The first terminal 640 of the enable controller 310A receives an input control signal (CS_IN). In some examples, CS_IN is an indication that the power stage 302A is ready to accept a pulse-width modulation (PWM) signal for power switches (not shown) of the power stage 302A. In such examples, CS_IN may be generated internally to the power stage 302A responsive receiving VDD, internal circuitry being powered up, and control logic being ready to accept the PWM signal from a controller (e.g., the controller 220 in FIG. 2).

In the example of FIG. 6, the power terminal 601 of the power stage 302A is also coupled to the first terminal 672 of the second current source 670. The second terminal 674 of the second current source 670 is coupled to the first terminal of the transistor N2. The second terminal of the transistor N2 is coupled to the first terminal of the resistor R2. The second terminal of the resistor R2 is coupled to a ground terminal. The control terminal of the transistor N2 is coupled to the third terminal of the operational amplifier 650. The first terminal 652 of the operational amplifier 650 receives VREF. The second terminal 654 of the operational amplifier 650 receives an internal TAO signal (TAO_INT), which is the voltage at the first terminal of the resistor R2.

The first terminal of the transistor P1 is coupled to the terminal 308A of the operational amplifier 306A and the control terminal of the transistor N1. The second terminal of the transistor P1 is coupled to a ground terminal or ground. The control terminal of the resistor P1 is coupled to the fourth terminal 618 of the clamp controller 610. The first terminal 612 of the clamp controller 610 receives a clamp enable signal (CLAMP_EN). The second terminal 614 of the clamp controller 610 receive TAO_INT. In some examples, TAO_INT equals or approximates TAO_EXT, but is used internally and is not provided to the output terminal 314A. The third terminal 616 of the clamp controller 610 receives VDD. The fifth terminal 620 of the clamp controller 610 is coupled to a ground terminal or ground.

In the example of FIG. 6, the first terminal 630 of the inverter 628 is coupled to the first terminal 612 of the clamp controller 610. The second terminal 632 of the inverter 628 is coupled to the control terminal of the switch S1. The first terminal 624 of the current source 622 is coupled to the fourth terminal 618 of the clamp controller 610. The second terminal 626 of the current source 622 is coupled to the first terminal of the switch S1. The second terminal of the switch S1 is coupled to the first terminal of the capacitor C1, the second terminal of the switch S2, and the third terminal 616 of the clamp controller 610. The second terminal of the capacitor C1 is coupled to the fifth terminal 620 of the clamp controller 610. The first terminal of the switch S2 is coupled to the second terminal 614 of the clamp controller 610. The control terminal of the switch S2 is coupled to the first terminal 612 of the clamp controller 610.

In the example of FIG. 6, the power stage 302A operates to control the voltage and current at the output terminal 314A responsive to the operation of the transistor N_A, which selectively enables or disables the output terminal 314A. The control of the transistor N_A may be based on CS1 provided by the enabled controller 310A. When disabled, the output terminal 314A is grounded. When enabled, the output terminal 314A begins to provide TAO_EXT responsive to the operations of the operational amplifier 306A and control of the transistor N1. In other words, the voltage at the output terminal 314A, when enabled, varies depending on the voltage applied to the control terminal of the transistor N1. With the arrangement of FIG. 6, the voltage at the control terminal of the transistor N1 varies depending on the output of the operational amplifier 306A and selective clamping performed by the transistor P1. In some examples, the output of the operational amplifier 306A varies as a function of temperature of the power stage 302A. Meanwhile, selective clamping at the control terminal of the transistor N1 is based on control of the transistor P1 by the clamp controller 610.

In some examples, the clamp controller 610 operates to: receive EN_CLAMP at the first terminal 612; receive TAO_INT at the second terminal 614; receive VDD at the third terminal 616; and provide a clamp control voltage (V_CLAMP) at the fourth terminal 618 responsive to EN_CLAMP, TAO_INT, and VDD. More specifically, when EN_CLAMP is asserted, the switch S1 is turned off, the switch S2 is turned on, and V_CLAMP is based on TAO_INT. A low value for TAO_INT turns on the transistor P1 and limits the voltage (NG_SF) at the control terminal of the transistor N1. If TAO_INT is higher than a threshold, the transistor P1 is turned off and NG_SF at the control terminal of the transistor N1 is based on the output of the operational amplifier 306A. In some examples, EN_CLAMP is asserted and V_CLAMP=TAO_INT by default after power up. On the rising edge of a first PWM signal (which indicates all phases have finished power up), EN_CLAMP is de-asserted, the output terminal 314A is enabled, and switching operations of the power stage 302A begin. When EN_CLAMP is de-asserted, clamping is gradually turned off by raising V_CLAMP from TAO_INT to VDD. In the example of FIG. 6, when EN_CLAMP is de-asserted, the switch S1 is turned on, the switch S2 is turned off, and V_CLAMP is based on the charge stored by the capacitor C1 responsive to current provided by the current source 622. With EN_CLAMP de-asserted, V_CLAMP will eventually turn off the transistor P1 and NG_SF at the control terminal of the transistor N1 will be based on the output of the operational amplifier 306A. In some examples, EN_CLAMP is asserted before the output terminal 314A is enabled. After the output terminal 314A is enabled, EN_CLAMP is de-asserted.

With the multiphase DC/DC converter circuitry 600 of FIG. 6, applying a clamp directly to the output terminal 314A is avoided. If a clamp were added directly to the output terminal 314A, a large amount of current from the output terminals of power stages would be sunk due to the selective "OR" signaling arrangement described herein. Applying a direct clamp to the output terminal 314A (and the other output terminals) may cause undesirable electromagnetic (EM) issues and/or other issues. In FIG. 6, selective clamping is added to the control terminal of the transistor N1, which functions as a source follower stage for the operational amplifier 306A. In some examples, the voltage at which the control terminal of the transistor N1 is clamped presumes some TSNS overshoot.

In the arrangement of FIG. 6, the transistor P1 is between the control terminal of the transistor N1 and ground. The control terminal of the transistor P1 is coupled to the first terminal of the capacitor C1, which is charged to TAO_INT via the switch S2. When NG_SF rises and is VtP1 higher than TAO_INT, clamping is tuned and limits NG_SF to TAO_INT+VtP1. When V_CLAMP rises such that the threshold voltage of the transistor P1 ($Vt_{P1}$) is approximately TAO_INT, clamping is turned on and limits NG_SF at the control terminal of the transistor N1 to Vt+TAO_INT.

In such examples, the clamping voltage for the output terminal 314A is set to TAO_INT+Vt minus the threshold voltage of the transistor N1 ($Vt_{N1}$). With $Vt_{P1}$ and $Vt_{N1}$ approximately equal to each other, the voltage at the output terminal 314A with clamping enabled is close to the voltage at the output terminal 314A with clamping disabled (approximately TAO_INT). In some examples, clamping is disabled when a PWM signal for switches of the power stage 302A is received such that normal operations of the power stage 302A are not affected.

To avoid overshoot, due to transients caused by turning off clamping suddenly, clamping is turned off gradually as described herein. In the example of FIG. 6, gradually turning off clamping is based on disconnecting the capacitor C1 from TAO_INT (by turning off the switch S2) and charging the capacitor C1 with current from the current source 622 via the switch S1. This raises the charge on the capacitor C1 from TAO_INT to VDD, which disables clamping.

Figure 7:
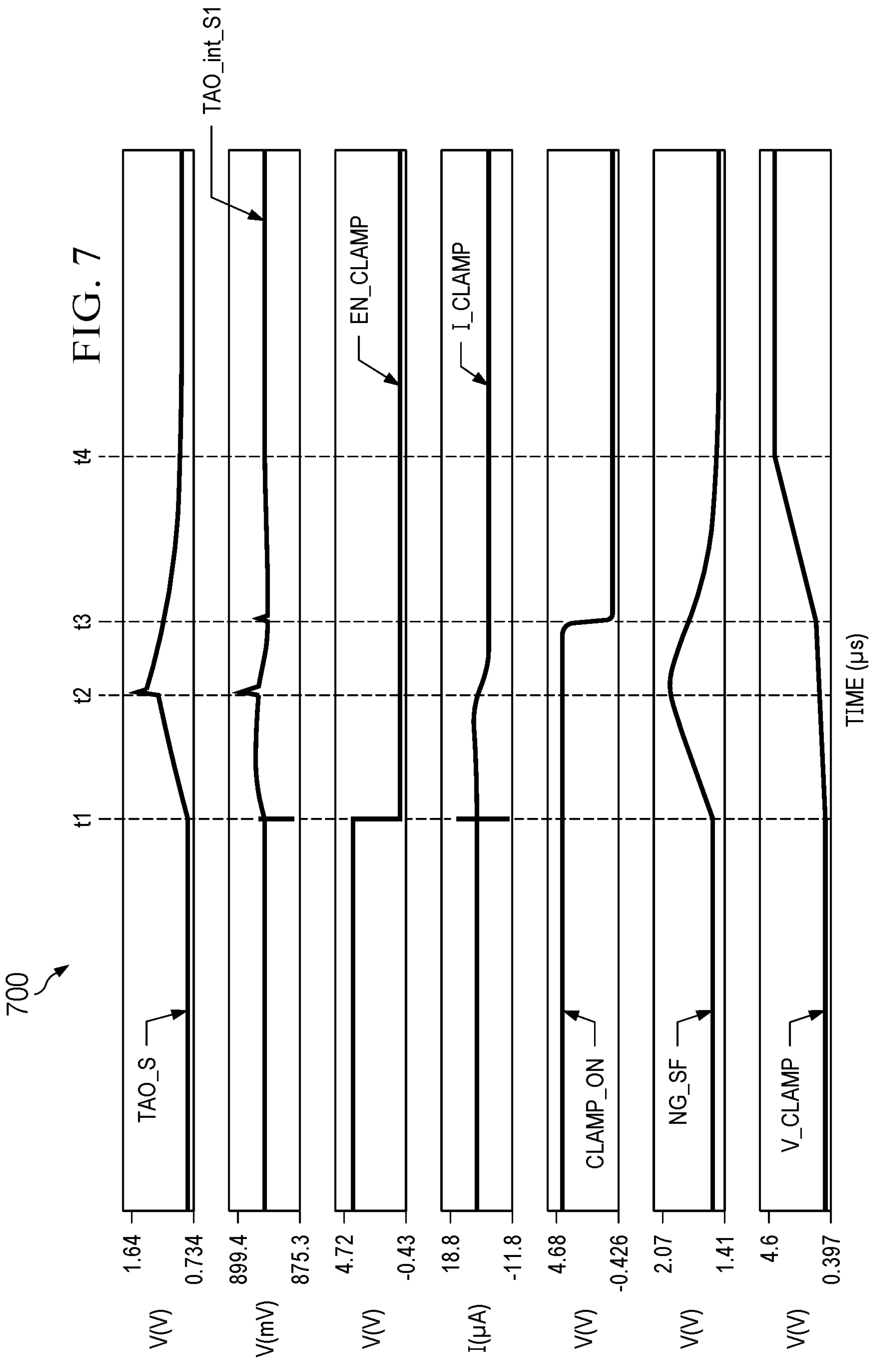
FIG. 7 is a timing diagram showing example signals of a multiphase DC/DC converter with selective output terminal clamping.

FIG. 7 is a timing diagram 700 showing example signals of a multiphase DC/DC converter with selective output terminal clamping. In the timing diagram 700, the example signals include an external signal (TAO_S), an internal TAO signal (TAO_int_S1), EN_CLAMP, a clamp current (I_CLAMP), a clamp on signal (CLAMP_ON), NG_SF, and V_CLAMP. In FIG. 7, times t1, t2, t3, and t4 are represented. Note: the times t1, t2, t3, and t4 in FIG. 7 relate only to FIG. 7, and the times t1, t2, t3, and t4 in FIG. 5 relate only to FIG. 5.

At time t1 in FIG. 7, EN_CLAMP is de-asserted (e.g., responsive to a first rising edge of a PWM signal). In response to EN_CLAMP being de-asserted, clamping is slowly released and is not fully turned off until time t3 in FIG. 7. From time t1 to time t2, TAO_S begins to rise from approximately 0.8V to 1.5V, I_CLAMP is maintained, NG_SF ramps up, and V_CLAMP slowly rises. The overshoot of TAO_S from time t1 to time t2 relative to a target value indicated by TAO_int_S1 (between 0.875V and 0.899V) stays within an acceptable range for TSNS as described herein. From time t2 to time t3, TAO_S begins to ramp down, I_CLAMP ramps down to zero, NG_SF begins to ramp down, and V_CLAMP continues to slowly increase. At time t3, CLAMP_ON is de-asserted indicating clamping is fully turned off. From time t3 to time t4, TAO_S continues to ramp down toward the target value indicated by TAO_int_S1, I_CLAMP stays at zero, NG_SF ramps down and begins to settle, and V_CLAMP ramps up more quickly. After time t4, TAO_S settles to the target value indicated by TAO_int_S1, NG_SF settles to a target voltage near 1.4V such that the related NMOS transistor (e.g., transistor N1 in FIG. 6) stays on, and V_CLAMP settles to a positive value such that the related PMOS transistor (e.g., transistor P1 in FIG. 6) stays off. The same description provided for the power stage 302A of FIG. 6 can be applied to each power stage of a multiphase DC/DC converter.

Figure 8:
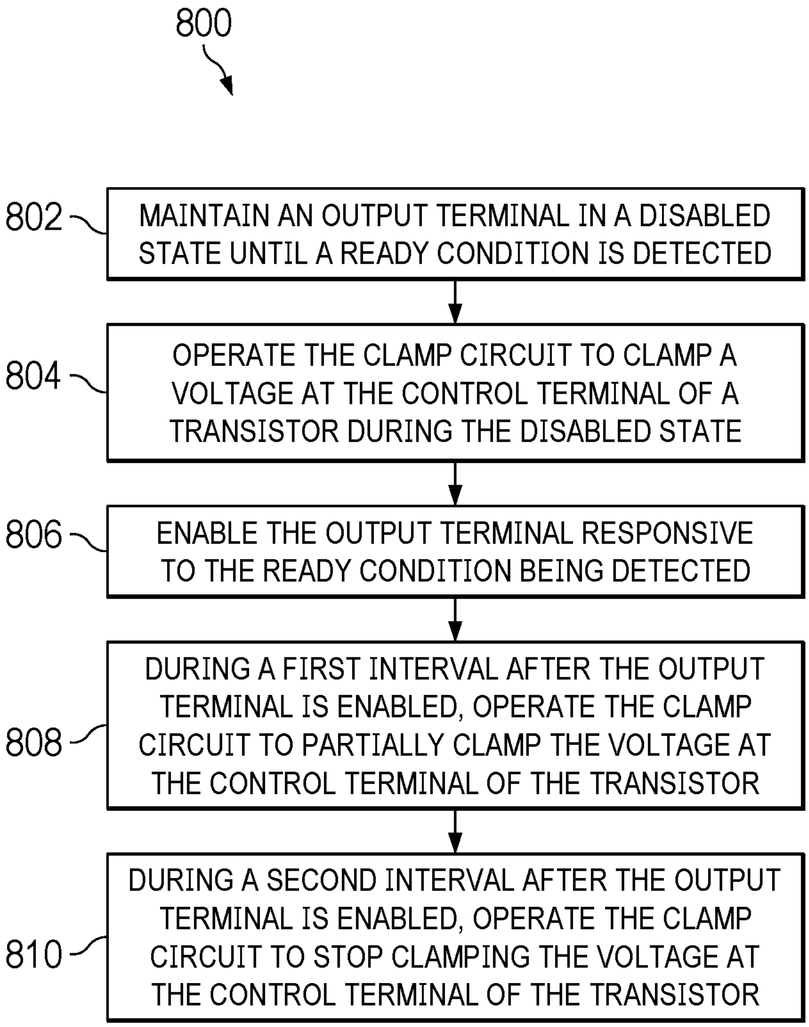
FIG. 8 is a flowchart showing an example output terminal control method.

FIG. 8 is a flowchart showing an example output terminal control method 800. In some examples, the method 800 is performed by a power stage, such as the power stage 302A in FIGS. 3 and 6. As shown, the method 800 includes maintaining an output terminal (e.g., the output terminal 314A) in a disabled state until a ready condition is detected at block 802. In some examples, the ready condition is a power ready signal (e.g., CS_IN herein) for a power stage. At block 804, a clamp circuit is operated to clamp a voltage (e.g., NG_SF in FIG. 6) at the control terminal of a transistor (e.g., N1 in FIG. 6) during the disabled state. At block 806, the output terminal is enabled responsive to the ready condition being detected. At block 808, the clamp circuit operates to partially clamp the voltage at the control terminal of the transistor during a first interval after the output terminal is enabled. At block 810, the clamp circuit is operated to stop clamping the voltage at the control terminal of the transistor during a second interval after the output terminal is enabled, where the second interval follows the first interval. In other words, clamping is released slowly using blocks 808 and 810.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component and/or a conductor.

A circuit or device described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field-effect transistor ("FET") such as an NFET or a PFET, a bipolar junction transistor (BJT—e.g., NPN transistor or PNP transistor), an insulated gate bipolar transistor (IGBT), and/or a junction field effect transistor (JFET) may be used in place of or in conjunction with the devices described herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control terminal and its first and second terminals. In the context of a FET, the control terminal is the gate, and the first and second terminals are the drain and source. In the context of a BJT, the control terminal is the base, and the first and second terminals are the collector and emitter.

References herein to a FET being "ON" means that the conduction channel of the FET is present and drain current may flow through the FET. References herein to a FET being "OFF" means that the conduction channel is not present so drain current does not flow through the FET. An "OFF" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other examples, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated circuit. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described examples, and other examples are possible, within the scope of the claims.

What is claimed is:

1. A circuit comprising:

an output terminal;

a first transistor having a first terminal, a second terminal, and a control terminal, the second terminal of the first transistor coupled to the output terminal; and a second transistor having a first terminal, a second terminal, and a control terminal, the first terminal of the second transistor coupled to the control terminal of the first transistor;

a first switch coupled between the control terminal of the second transistor and a first voltage terminal;

a second switch coupled between the control terminal of the second transistor and a second voltage terminal, the first and second switches each having a control terminal coupled to a clamp enable input; and a capacitor coupled to the control terminal of the second transistor.

2. The circuit of claim 1, further comprising a current source coupled between the first voltage terminal and the first switch, and an inverter coupled between the clamp enable input and the control terminal of the first switch.

3. The circuit of claim 1, wherein the first transistor, the first switch, and the second switch are a n-channel metal-oxide semiconductor (NMOS) transistor, and the second transistor is a p-channel metal-oxide semiconductor (PMOS) transistor.

4. The circuit of claim 1, further comprising:

a resistor having a first terminal and second terminal, the first terminal of the resistor coupled to the output terminal;

a third transistor having a first terminal, a second terminal, and a control terminal, the first terminal of the third transistor coupled to the output terminal.

5. The circuit of claim 4, further comprising an enable controller having a first terminal and a second terminal, the second terminal of the enable controller coupled to the control terminal of the third transistor.

6. The circuit of claim 5, wherein the enable controller is configured to:

receive a control signal at its first terminal indicating whether power supply for the circuit is ready or not; and provide an enable signal at its second terminal responsive to the control signal indicating the power supply for the circuit is ready.

7. The circuit of claim 6, further comprising an operational amplifier having a first terminal, a second terminal, and a third terminal, the third terminal of the operational amplifier coupled to the control terminal of the first transistor.

8. The circuit of claim 7, wherein the operational amplifier and the first transistor are configured to control a temperature sense signal at the output terminal when the output terminal is enabled.

9. The circuit of claim 1, wherein the output terminal, the first transistor, and the clamp circuit are components of a multiphase direct-current to direct-current (DC/DC) converter, the multiphase DC/DC converter configured to:

provide a first voltage level below a first threshold at the output terminal if the output terminal is not enabled;

provide a second voltage level above a second threshold at the output terminal if the output terminal is enabled and there is an overcurrent condition; and provide a third voltage level between the first threshold and the second threshold at the output terminal if the output terminal is enabled and there is not an overcurrent condition, the third voltage level indicating a temperature.

10. A circuit comprising:

an output terminal;

control circuitry coupled to the output terminal, the control circuitry including a transistor and a clamp circuit, the transistor having a control terminal, and the control circuitry having a clamp enable input and configurable to:

responsive to the clamp enable input having a first state, set a clamp voltage to a first value, and clamp a voltage at the output terminal using the clamp voltage; and responsive to the clamp enable input having a second state, removing the clamping of the voltage at the output terminal by ramping the clamp voltage.

11. The circuit of claim 10, wherein the transistor and the control circuitry are configurable to:

provide a first voltage level below a first threshold at the output terminal if the output terminal is not enabled;

provide a second voltage level above a second threshold at the output terminal if the output terminal is enabled and there is an overcurrent condition; and provide a third voltage level between the first threshold and the second threshold at the output terminal if the output terminal is enabled and there is not an overcurrent condition.

12. The circuit of claim 11, wherein the transistor and the control circuitry are configurable to adjust the third voltage level to indicate temperature change.

13. The circuit of claim 10, wherein the transistor is a first transistor and the control circuitry includes:

a second transistor having a first terminal, a second terminal, and a control terminal, the first terminal of the second transistor coupled to the control terminal of the first transistor; and a capacitor having a first terminal and a second terminal, the first terminal of the capacitor coupled to the control terminal of the second transistor.

14. A system comprising:

a multiphase direct-current to direct-current (DC/DC) converter having an output terminal, the multiphase DC/DC converter including:

a first transistor having first terminal, a second terminal, and a control terminal, the second terminal of the first transistor coupled to the output terminal;

a second transistor having a first terminal, a second terminal, and a control terminal, the first terminal of the second transistor coupled to the control terminal of the first transistor;

a first switch coupled between the control terminal of the second transistor and a first voltage terminal;

a second switch coupled between the control terminal of the second transistor and a second voltage terminal, the first and second switch each having a control terminal coupled to a clamp enable input; and a capacitor coupled to the control terminal of the second transistor.

15. The system of claim 14, further comprising a current source coupled between the first voltage terminal and the first switch, and an inverter coupled between the clamp enable input and the control terminal of the first switch.

16. The system of claim 15, further comprising an enable controller having a first terminal and a second terminal, the second terminal of the enable controller coupled to the control terminal of the third transistor, and the enable controller is configured to:

receive a control signal at its first terminal indicating whether a power supply for the multiphase DC/DC converter is ready or not; and provide an enable signal at its second terminal responsive to the control signal indicating the power supply for the multiphase DC/DC converter is ready.

17. The system of claim 16, further comprising an operational amplifier having a first terminal, a second terminal, and a third terminal, the third terminal of the operational amplifier coupled to the control terminal of the first transistor, wherein the operational amplifier and the first transistor are configured to control a temperature sense signal at the output terminal when the output terminal is enabled.

18. The system of claim 14, wherein the multiphase DC/DC converter is a first multiphase DC/DC converter, and the system includes:

additional multiphase DC/DC converters, each of the additional multiphase DC/DC converters having a respective output terminal and including:

a respective first transistor having a first terminal, a second terminal, and a control terminal, the second terminal of each respective first transistor coupled to the respective output terminal;

a respective second transistor having a first terminal, a second terminal, and a control terminal, the first terminal of each respective second transistor coupled to the control terminal of the respective first transistor;

a respective first switch coupled between the control terminal of each respective second transistor and the first voltage terminal;

a respective second switch coupled between the control terminal of each respective second transistor and the second voltage terminal, the respective first and second switches each having a control terminal coupled to the clamp enable input; and a respective capacitor coupled to the control terminal of each respective second transistor.

19. The system of claim 18, further comprising:

a controller having a sense terminal coupled to the respective output terminal of the first multiphase DC/DC converter and of each of the additional multiphase DC/DC converters, wherein the controller is configured to:

interpret a voltage level below a first threshold at its sense terminal for less than a threshold amount of time as an indication of at least one of the respective output terminals not being enabled;

interpret a voltage level below the first threshold at its sense terminal for more than the threshold amount of time as an indication of a power supply error;

interpret a voltage level above a second threshold at its sense terminal as an overcurrent condition of at least one of the first multiphase DC/DC converter and each of the additional multiphase DC/DC converters; and interpret a voltage level between the first threshold and the second threshold at its sense terminal as a highest temperature sense signal of the first multiphase DC/DC converter and the additional multiphase DC/DC converters.

* * * * *